Patented Jan. 7, 1947

2,414,026

UNITED STATES PATENT OFFICE 2,414,026

REGENERATION OF ANION EXCHANGE MATERIALS AND RECOVERY OF ACIDS

John W. Cox and Abraham Sidney Behrman, Chicago, Ill., assignors to Infilco Incorporated, a corporation of Delaware No Drawing. Application September 2, 1941, Serial No. 409,268

1 Claim. (Cl. 23—139)

This invention relates to an improved method of regenerating anion-exchange materials.

One of the primary objects of the invention is to provide an improved method of regenerating a material used to remove acid or acidic substances from water.

One of the objects of this invention is to provide a new method for the cyclic removal of acid from water or other aqueous solutions.

Another object of the invention is to provide a new and useful method of recovery of the acid that has been taken up by the anion exchange material.

A further object of the invention is to provide a new and useful method for the separation of volatile acids from non-volatile acids.

A still further object of the invention is to provide an improved method of treating water or aqueous solutions containing acids or acidic material.

Other objects of the invention will be apparent from the description and claim which follow.

It is known that acid can be removed from aqueous solutions by treating them with certain materials, such as certain synthetic resins, as for example, the metaphenylenediamene-formaldehyde resins described by Adams and Holmes, U. S. Patent No. 2,151,883, issued March 28, 1939, and by some metallic oxides such as amorphous and porous alumina and iron oxide in gel form. Such materials have a definite anion-exchange or anion-removal capacity and if that capacity has been exhausted many such materials may be regenerated by treating the material with a solution of an alkali such as caustic soda, sodium carbonate, or ammonium hydroxide and washing with water to remove the excess of the alkali. While such a process of regeneration is in many cases quite effective, it is not always suitable or economical. For example, in some industries the process or waste waters may contain small quantities of acids of acidic substances. In one particular plant approximately a half million gallons of condensate was wasted daily because it was an approximately 0.0069 normal solution of acetic acid, containing about 380 parts acetic acid per million. Except for its acetic acid content, this large quantity of distilled water would have been admirably suited for use in boilers or other plant operations. It was desired both to remove the acid in order to make available the resulting large quantity of pure water and also to recover the relatively valuable acetic acid so removed. It was found that the acetic acid could be effectively removed from the water by means of commercially available anion-exchange materials, and that these materials could then be regenerated in the usual way with a dilute solution of an alkali such as sodium hydroxide or sodium carbonate. Unfortunately, however, this alkaline regeneration resulted in the recovery of the acetic acid as sodium acetate, from which it could be obtained as the free acid only with considerable effort and expense; furthermore, since the concentration of the solution of alkali employed for regeneration is usually only 0.5 to 1.0 per cent and never over 2 per cent, the solution of sodium acetate thus obtained was so dilute as to make recovery by evaporation prohibitively expensive and therefore impractical.

The present invention relates to a new method of regenerating such anion-exchange material by which the recovery of acid now becomes commercially feasible. The invention comprises in essence the regeneration of the anion-exchange material by means of heat instead of with a solution of an alkali. Our preferred type of heating is distilling with steam, either saturated or superheated, though other types of heating, such as with hot air or dry distillation, may also be utilized. We have found that anion-exchange materials may be regenerated very effectively by heating, and particularly by treatment with steam. This regeneration permits the recovery of minute or larger amounts of acid from waste water or other dilute solutions. It also permits the recovery of these acids as such, and not as salts which must be reconverted to the acids. It also permits the recovery of such acids in concentrated form. Finally, it avoids the long washing with water required if regeneration has been accomplished by treatment with a solution of an alkali.

Our invention is particularly useful in the recovery of volatile acids, such as acetic, hydrochloric, nitric, and other volatile acids, particularly the volatile organic acids.

The examples given below illustrate the process in small-scale operation and the results that can be secured therefrom. As a matter of fact, in large-scale installations results should be much superior to those given below, due to the use of an insulated bed of materials and, if desired, of super-heated steam, which many industrial plants have available. Tests were made with both synthetic resins and with an amorphous porous alumina. In some instances, it was found that the synthetic resins were adversely affected by steam itself. Amorphous porous alumina, on the other hand, and some resins are resistant to steam and can be subjected to many cycles of the regeneration. For the purpose of illustrating the process, test runs with a sample of an amorphous porous alumina will be given.

In these test runs given below a 25 milliliter bed of 24 to 30 mesh porous amorphous alumina was prepared in a one-inch diameter glass tube. One liter of 0.0069 normal acetic acid solution, that is, a solution containing 414 milligrams of acetic acid per liter, was passed downwardly through the bed at the usual operating flow rate of approximately one gallon per square foot per minute. This particular strength of solution was used as that is the strength of the waste condensate in the particular manufacturing establishment mentioned above. Saturated steam was then passed downwardly through the bed for a period of one hour, and the vapors escaping from the bed were condensed by a water condenser and tested by the usual method to determine the amount of acid removed. The bed was then cooled, backwashed, and the acid adsorption run repeated. In this manner, it was possible to determine definitely the amount of acid recovered by this process of regeneration and also the ability of the acid-removal material to be used many times in this cyclic process. Runs 1 to 5, inclusive, given below, were regenerated by steam as above described.

In runs 1, 3, 4 and 5 the effluent from the acid adsorption run was divided, as it came from the bed, into ¼ liter portions in order to determine accurately the amount of acid at different stages of the treatment with the material. In run 2 the liquid was divided into ten equal portions for the same reason. In the steam regeneration of runs 1 and 2 the amount of distillate was likewise divided into four equal fractions and in runs 3, 4 and 5 the condensate from the steam was divided into five equal fractions, in order to determine the speed and efficiency of the regeneration.

| Acid-adsorption | | | Regeneration | |
| --- | --- | --- | --- | --- |
| Volume acid | Residual acidity of effluent | Milliequiv. acid removed | Distillate fraction | Milliequiv. acid removed |

RUN 1

| | | | | |
| --- | --- | --- | --- | --- |
| 0.00-0.25 | 0.180 | 1.545 | 1 | 2.17 |
| 0.25-0.50 | 0.655 | 1.070 | 2 | .48 |
| 0.50-0.75 | 1.020 | 0.705 | 3 | .46 |
| 0.75-1.00 | 1.150 | 0.575 | 4 | .33 |
| | 3.005 | 3.895 | | 3.44 |

RUN 2

| | | | | |
| --- | --- | --- | --- | --- |
| 0.00-0.10 | 0.018 | 0.672 | 1 | 1.09 |
| 0.10-0.20 | 0.041 | 0.649 | 2 | 1.01 |
| 0.20-0.30 | 0.100 | 0.590 | 3 | 0.64 |
| 0.30-0.40 | 0.254 | 0.436 | 4 | 0.52 |
| 0.40-0.50 | 0.318 | 0.372 | | |
| 0.50-0.60 | 0.368 | 0.322 | | 3.26 |
| 0.60-0.70 | 0.415 | 0.275 | | |
| 0.70-0.80 | 0.447 | 0.243 | | |
| 0.80-0.90 | 0.488 | 0.202 | | |
| 0.90-1.00 | 0.522 | 0.168 | | |
| | 2.971 | 3.929 | | |

RUN 3

| | | | | |
| --- | --- | --- | --- | --- |
| 0.00-0.25 | 0.15 | 1.575 | 1 | 1.104 |
| 0.25-0.50 | 0.53 | 1.195 | 2 | 0.994 |
| 0.50-0.75 | 1.11 | 0.615 | 3 | 0.596 |
| 0.75-1.00 | 1.40 | 0.325 | 4 | 0.516 |
| | | | 5 | 0.328 |
| | 3.19 | 3.71 | | 3.538 |

RUN 4

| | | | | |
| --- | --- | --- | --- | --- |
| 0.00-0.25 | 0.15 | 1.575 | 1 | 1.115 |
| 0.25-0.50 | 0.63 | 1.095 | 2 | 0.892 |
| 0.50-0.75 | 1.01 | 0.715 | 3 | 0.630 |
| 0.75-1.00 | 1.22 | 0.505 | 4 | 0.478 |
| | | | 5 | 0.332 |
| | 3.01 | 3.89 | | 3.447 |

RUN 5

| | | | | |
| --- | --- | --- | --- | --- |
| 0.00-0.25 | 0.160 | 1.565 | 1 | 1.188 |
| 0.25-0.50 | 0.665 | 1.060 | 2 | 0.916 |
| 0.50-0.75 | 1.035 | 0.690 | 3 | 0.640 |
| 0.75-1.00 | 1.240 | 0.485 | 4 | 0.568 |
| | | | 5 | 0.448 |
| | 3.1 | 3.8 | | 3.76 |

From these data it will be at once apparent that the method of the regeneration with steam makes it possible to recover substantially all of the acid that has been adsorbed by the porous amorphous alumina or other anion-removal agent; that a large part of the adsorbed acid may be recovered by a very short regenerating period; that the acid is recovered as a solution of the free acid, not of one of its salts; that the step of rinsing with water required after regeneration with an alkali may be omitted; that the method is simple and economical; and that the method is suitable for repeated use in cyclic operations.

As has already been mentioned, other forms of heating the anion-exchange material to effect its regeneration may be utilized. Heating by means of dry, hot air, or dry distillation, for example, are other methods of carrying out the basic process of our invention. As cases in point, we have removed hydrochloric and nitric acids by suitable anion-exchange materials, and have recovered the acids from the adsorbents by externally heating the adsorbent in its container to a temperature sufficiently high to drive off a substantial portion or all of the adsorbed acid.

Another useful application of our novel method of regeneration is for the separation of volatile from the non-volatile acids that have been taken up by the acid-removal material. For example, a bed of synthetic organic nitrogenous anion exchange resin was saturated with sulfuric and hydrochloric acids in the ratio of about two parts of sulfuric acid to one part of hydrochloric acid (in terms of equivalent acidity) by passing through the bed a dilute solution of the mixed acids. The bed was then subjected to our process of regeneration with steam in the manner previously described. The condensate, especially the first portions, contained hydrochloric acid almost exclusively, being practically free of sulfuric acid. When the treatment of steam was continued after a large part of the adsorbed hydrochloric acid had been distilled off and determined in the condensate, small quantities of sulfate ion began to appear in further portions of the condensate; but we are not yet certain whether this was due to a slight decomposition of the resin with its contained sulfuric acid, or to a fractionating effect which would make it possible to separate several acids of relatively different volatilities. When the bed, from which a large part of the hydrochloric acid had been removed by steam regeneration, was then treated with sodium hydroxide in the usual method of alkali regeneration, the spent regenerating solution was found to contain a large quantity of sulfates, and only a relatively very small quantity of chlorides, thus confirming the selective nature of the steam regeneration and demonstrating the possibilities of steam regeneration supplemented by alkali regeneration in cases where this might be desirable; in such cases, of course, it will generally be desirable to follow the treatment with alkali by the customary washing with water.

In the foregoing description it will be noted that the terms "anion-exchange," "anion-removal," "acid adsorption," and "acid removal" have been used interchangeably to describe the removal of acids and acidic substances from water, other aqueous solutions and fluids by certain synthetic resins and metallic oxides. This interchangeability is in conformity with current usage in the art, and is due to the fact that there is as yet no general agreement as to the mechanism of the acid removal, that is, whether it functions through simple adsorption, anion-exchange, or some other phenomenon.

By anion exchange is meant a reaction involving anions which is analogous to the base exchange reaction of zeolites, i. e. the replacement of an anion, which is loosely held by the insoluble exchange material by another anion from the solution in contact with the material. The mechanism of the exchange has not been definitely established. It seems, however, that if it is a sorption phenomenon, it is an anion sorption rather than a normal molecular adsorption common in the art.

The alumina used in the above mentioned tests is essentially aluminum oxide in porous amorphous form with a minor amount of water of hydration, such as that prepared by U. S. Patents Nos. 1,868,869 and 2,015,593, although amorphous and porous aluminum prepared by other methods might be used.

Manifestly, many variations and modifications of the invention hereinbefore set forth may be made by persons skilled in the art without departing from the spirit or scope hereof.

We claim:

A method for separating volatile from relatively non-volatile acids taken up from solutions by an anion-removal material which comprises subjecting the material with its adsorbed content of mixed acids to the action of steam until a substantial portion of the more volatile acid has been removed and completing the regeneration of the material by treating it with a solution of an alkali.

JOHN W. COX.
ABRAHAM SIDNEY BEHRMAN.